United States Patent
Kato et al.

(10) Patent No.: US 10,739,923 B2
(45) Date of Patent: Aug. 11, 2020

(54) TOUCH PANEL MEMBER

(71) Applicant: Panasonic Intellectual Property Management Co., Ltd., Osaka (JP)

(72) Inventors: Hiroaki Kato, Mie (JP); Yukio Matsushita, Mie (JP); Masahiro Kawada, Mie (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/326,388

(22) PCT Filed: Aug. 23, 2017

(86) PCT No.: PCT/JP2017/030017
§ 371 (c)(1),
(2) Date: Feb. 19, 2019

(87) PCT Pub. No.: WO2018/047619
PCT Pub. Date: Mar. 15, 2018

(65) Prior Publication Data
US 2019/0227651 A1 Jul. 25, 2019

(30) Foreign Application Priority Data
Sep. 7, 2016 (JP) ................. 2016-175005

(51) Int. Cl.
G06F 3/041 (2006.01)
G06F 3/044 (2006.01)

(52) U.S. Cl.
CPC ............ G06F 3/044 (2013.01); G06F 3/0445 (2019.05); G06F 3/0446 (2019.05);
(Continued)

(58) Field of Classification Search
None
See application file for complete search history.

(56) References Cited

U.S. PATENT DOCUMENTS

2014/0118641 A1* 5/2014 Ryu .................. G06F 1/1692
349/12
2014/0333555 A1 11/2014 Oh et al.
(Continued)

FOREIGN PATENT DOCUMENTS

JP 2008-129708 6/2008
JP 2014-157400 8/2014
(Continued)

OTHER PUBLICATIONS

International Search Report of PCT application No. PCT/JP2017/030017 dated Sep. 26, 2017.

Primary Examiner — Joseph R Haley
(74) Attorney, Agent, or Firm — Greenblum & Bernstein, P.L.C.

(57) ABSTRACT

A touch panel member includes a first transparent resin layer, a first electrode substrate, a second transparent resin layer, and a second electrode substrate, which are disposed in this order. The first electrode substrate includes a first substrate and a first conductive pattern group. The second electrode substrate includes a second substrate and a second conductive pattern group. When a reference conductor is brought into contact with a touch panel cover while the touch panel cover is disposed on the first transparent resin layer at a side opposite to the first electrode substrate, the second conductive pattern group is configured to cause a second electrostatic capacity between the reference conductor and the second conductive pattern group range from 80% to 120%, inclusive, of a first electrostatic capacity between the reference conductor and the first conductive pattern group.

4 Claims, 7 Drawing Sheets

(52) U.S. Cl.
CPC .. *G06F 3/0448* (2019.05); *G06F 2203/04103* (2013.01); *G06F 2203/04112* (2013.01)

(56) References Cited

U.S. PATENT DOCUMENTS

2016/0202842 A1    7/2016  Uriu et al.
2016/0274703 A1*   9/2016  Satou ..................... G06F 3/044

FOREIGN PATENT DOCUMENTS

| JP | 2014-219986 | 11/2014 |
| WO | 2015/029350 | 3/2015 |

\* cited by examiner

TOUCH PANEL MEMBER

CROSS-REFERENCE TO RELATED APPLICATIONS

This application is a U.S. national stage application of the PCT International Application No. PCT/JP2017/030017 filed on Aug. 23, 2017, which claims the benefit of foreign priority of Japanese patent application 2016-175005 filed on Sep. 7, 2016, the contents all of which are incorporated herein by reference.

TECHNICAL FIELD

The present disclosure relates to a touch panel member.

BACKGROUND

A projected capacitive touch panel is used as an input device for selecting an option displayed on a display screen. This touch panel is constituted by a layer having a large number of see-through electrodes aligned in a specific pattern on a transparent substrate layer and a cover of glass or plastic stacked on the surface of the layer. The see-through electrodes are generally constituted by a plurality of X electrodes and a plurality of Y electrodes each of which is orthogonal to each of the plurality of X electrodes so as to represent two-dimensional coordinates of X axis and Y axis. And a structure in which a plurality of X electrodes and a plurality of Y electrodes are respectively disposed on two layers different in a distance from the cover is used. A drive voltage of an alternating signal from an alternating signal source is applied to each of the electrodes. When a fingertip (conductor) is put close to the surface of the cover, the fingertip and one of the plurality of X electrode are brought into capacitive coupling to form an electrostatic capacity (capacitor). Similarly, the fingertip and one of the plurality of Y electrode are brought into capacitive coupling to form a capacitor. By detecting, as a change in alternating signal voltage, a change in the self-capacitance of each of the electrodes due to the formation of this capacitor, it is possible to specify the touch position of the fingertip with high accuracy.

In recent years, there has been demand for large-size and high-sensitivity touch panels. And commercialization of see-through electrodes with a mesh pattern with low wiring resistance have been increasingly promoted. The mesh pattern is divided by partially removing or the like for defining electrode regions. (See, Unexamined Japanese Patent Publication No. 2014-157400 and Unexamined Japanese Patent Publication No. 2008-129708)

SUMMARY

A touch panel member according to a first aspect of the present disclosure includes a first transparent resin layer, a first electrode substrate, a second transparent resin layer, and a second electrode substrate, which are disposed in this order. The first electrode substrate includes a first substrate having a first main surface and a second main surface, and a first conductive pattern group disposed on the first main surface of the first substrate. The second electrode substrate includes a second substrate having a first main surface and a second main surface, and a second conductive pattern group disposed on the first main surface of the second substrate. When a reference conductor is brought into contact with a touch panel cover while the touch panel cover is disposed on the first transparent resin layer at a side opposite to the first electrode substrate, the second conductive pattern group is configured to cause a second electrostatic capacity between the reference conductor and the second conductive pattern group range from 80% to 120%, inclusive, of a first electrostatic capacity between the reference conductor and the first conductive pattern group.

A touch panel member according to a second aspect of the present disclosure includes a transparent resin layer and an electrode substrate, which are disposed in this order. The electrode substrate includes a substrate having a first main surface and a second main surface, a first conductive pattern group disposed on the first main surface, and a second conductive pattern group disposed on the second main surface. When a reference conductor is brought into contact with a touch panel cover while the touch panel cover is disposed on the transparent resin layer at a side opposite to the electrode substrate, the second conductive pattern group is configured to cause a second electrostatic capacity between the reference conductor and the second conductive pattern group range from 80% to 120%, inclusive, of a first electrostatic capacity between the reference conductor and the first conductive pattern group.

According to the present disclosure, the see-through electrodes having a two-layer structure can be excellent in detection sensitivity.

DESCRIPTION OF EMBODIMENTS

Figure 9A:
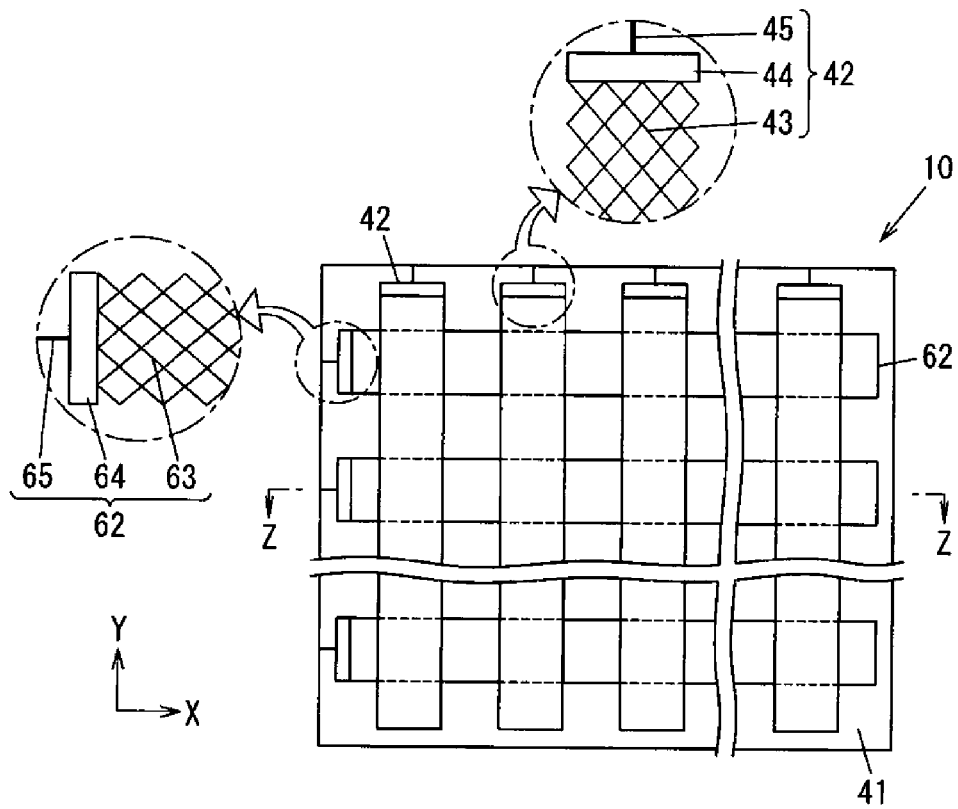
FIG. 9A is a schematic front view illustrating a projected capacitive touch panel.
Figure 9B:
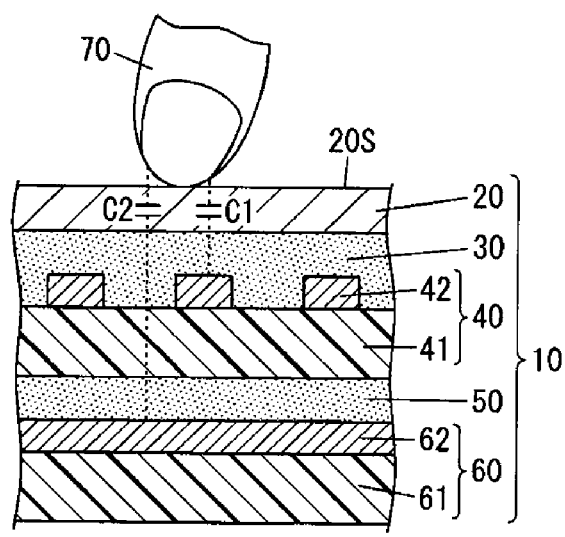
FIG. 9B is a schematic cross-sectional view illustrating the touch panel illustrated in FIG. 9A taken along cut line Z-Z, illustrating a state in which a fingertip is in contact with a surface of a cover of the touch panel.

Prior to description of an exemplary embodiment of the present disclosure, problems found in conventional techniques will briefly be described. FIG. 9A is a schematic front view illustrating projected capacitive touch panel 10. FIG. 9B is a schematic cross-sectional view illustrating touch panel 10 illustrated in FIG. 9A taken along cut line Z-Z, illustrating a state in which fingertip 70 is in contact with surface 20S of cover 20 of touch panel 10.

Touch panel 10 includes cover 20, upper transparent resin layer 30, upper electrode substrate 40, lower transparent resin layer 50, lower electrode substrate 60, and a position detection circuit (not illustrated). As illustrated in FIG. 9B, cover 20, upper transparent resin layer 30, upper electrode substrate 40, lower transparent resin layer 50, and lower electrode substrate 60 are stacked in this order. Upper electrode substrate 40 has upper transparent substrate 41 and a plurality of X electrodes 42 as see-through electrodes formed on one surface of upper transparent substrate 41 as illustrated in FIG. 9B. Each of X electrodes 42 includes mesh-structure X electrode portion 43 that is constituted by thin metal wires, upper electrode pad portion 44, and upper extraction electrode portion 45. X electrode portion 43, upper electrode pad portion 44, and upper extraction electrode portion 45 are electrically connected in this order along a Y direction as illustrated in FIG. 9A. Lower electrode substrate 60 has lower transparent substrate 61 and a plurality of Y electrodes 62 as see-through electrodes formed on one surface of lower transparent substrate 61 as illustrated in FIG. 9B. Each of Y electrodes 62 is constituted by Y electrode portion 63 that is configured in the same manner as X electrode portion 43, lower electrode pad portion 64, and lower extraction electrode portion 65. Y electrode portion 63, lower electrode pad portion 64, and lower extraction electrode portion 65 are electrically connected in this order along an X direction as illustrated in FIG. 9A. In other words, the plurality of X electrodes 42 and the plurality of Y electrodes 62 are designed in the same manner. Each of X electrodes 42 and each of Y electrodes 62 are disposed orthogonal to each other, and disposed via lower transparent resin layer 50. A structure for X electrodes 42 and each of Y electrodes 62 is a two-layer structure in which the two layers are different in the distance from cover 20 as illustrated in FIG. 9B. The position detection circuit is electrically connected to upper extraction electrode portion 45 and lower extraction electrode portion 65.

In touch panel 10, when fingertip 70 is in contact with surface 20S of cover 20, cover 20 and upper transparent resin layer 30 exist between fingertip 70 and X electrodes 42 (specifically, X electrode portion 43) as illustrated in FIG. 9B. Cover 20, upper transparent resin layer 30, upper electrode substrate 40, and lower transparent resin layer 50 exist between fingertip 70 and Y electrodes 62 (specifically, the Y electrode portion 63). A capacitor between X electrode 42 and fingertip 70 and a capacitor between Y electrode and fingertip 70 are respectively formed via the corresponding thickness therebetween.

It is known that, in a projected capacitive touch panel, the capacitance of the capacitor formed between the see-through electrode and the fingertip is in proportion to the shared area and is in inverse proportion to the distance between the electrode and the fingertip. Equal voltages are applied to X electrodes 42 and Y electrodes 62. As described above, the plurality of X electrodes 42 and the plurality of Y electrodes 62 are designed in the same manner. A distance between fingertip 70 and Y electrode 62 is longer than a distance between fingertip 70 and X electrode 42 at least by thicknesses of upper transparent substrate 41 and lower transparent resin layer 50. Accordingly, since electrostatic capacity C1 is too large and electrostatic capacity C2 is too small, there is a possibility that detection sensitivity of the Y axis with respect to fingertip 70 may become low. That is, there is a possibility that the detection sensitivity may not be good in the see-through electrodes having two-layer structure.

Accordingly, the present disclosure provides a touch panel member that can be excellent in the detection sensitivity in see-through electrodes having two-layer structure.

Hereinafter, exemplary embodiments of the present disclosure will be described.

[Touch Panel 1 According to First Exemplary Embodiment]

Figure 1:
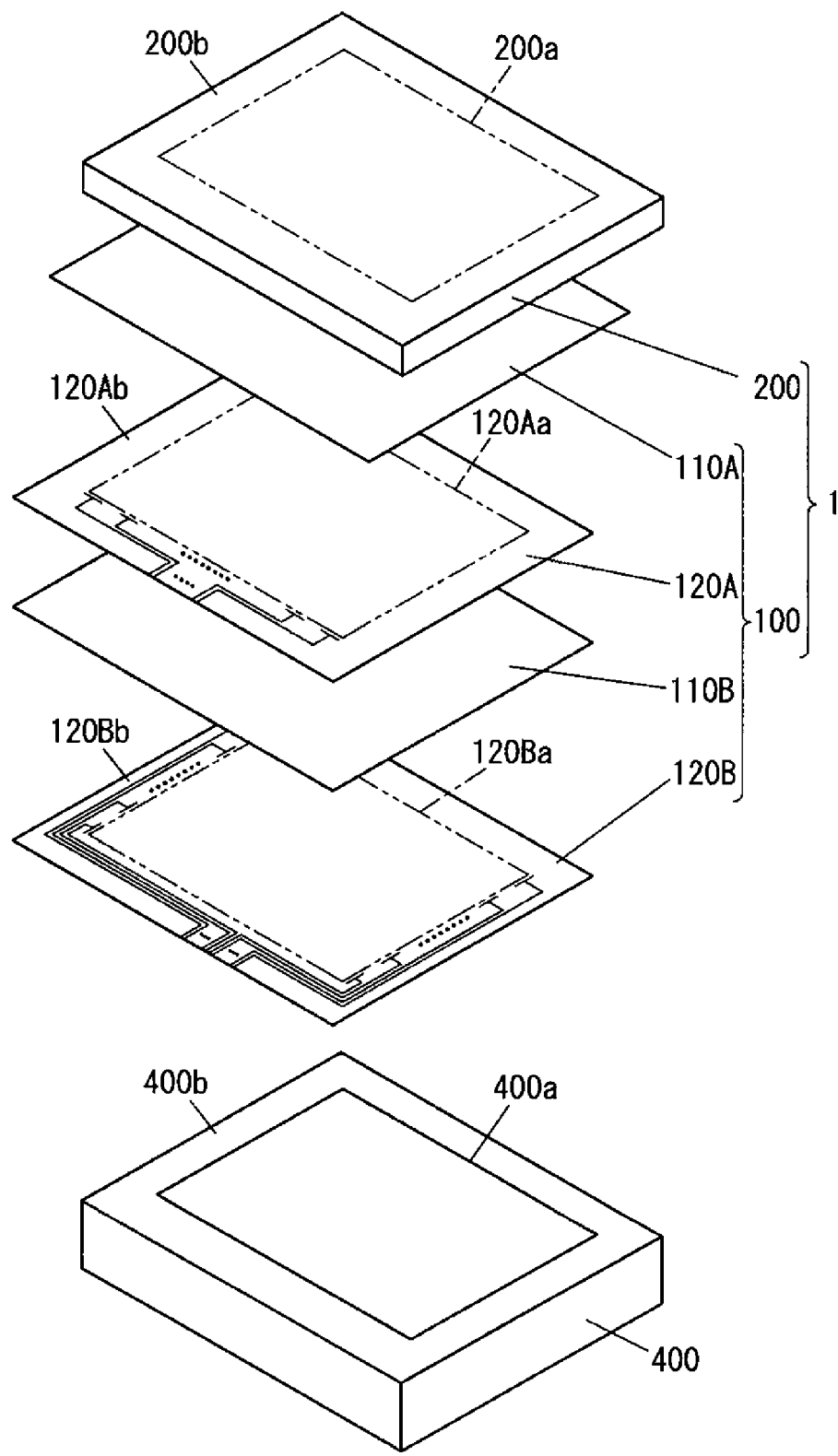
FIG. 1 is a schematic exploded perspective view illustrating an image display device including a touch panel according to a first exemplary embodiment.
Figure 2A:
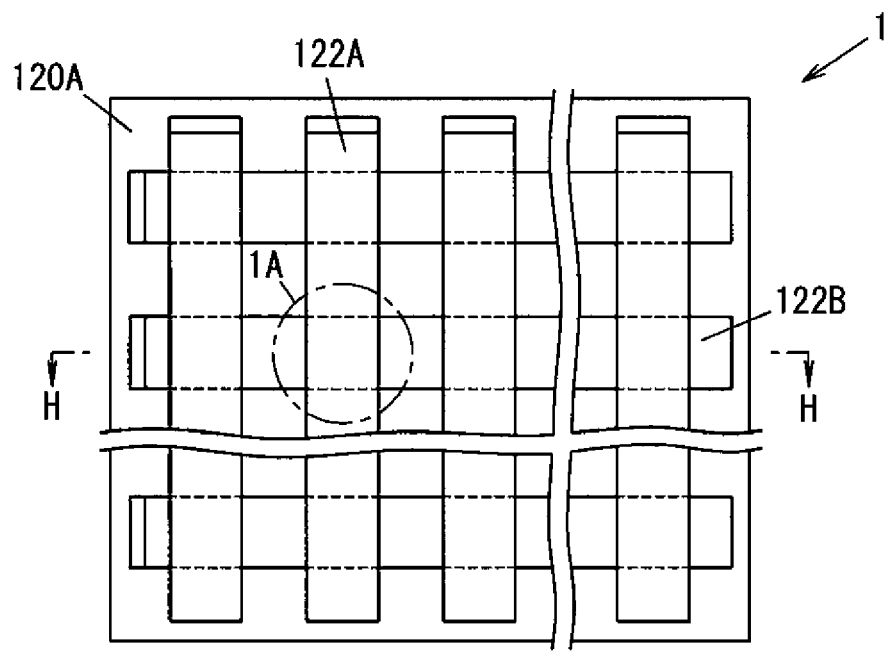
FIG. 2A is a schematic front view illustrating the touch panel according to the first exemplary embodiment.
Figure 2B:
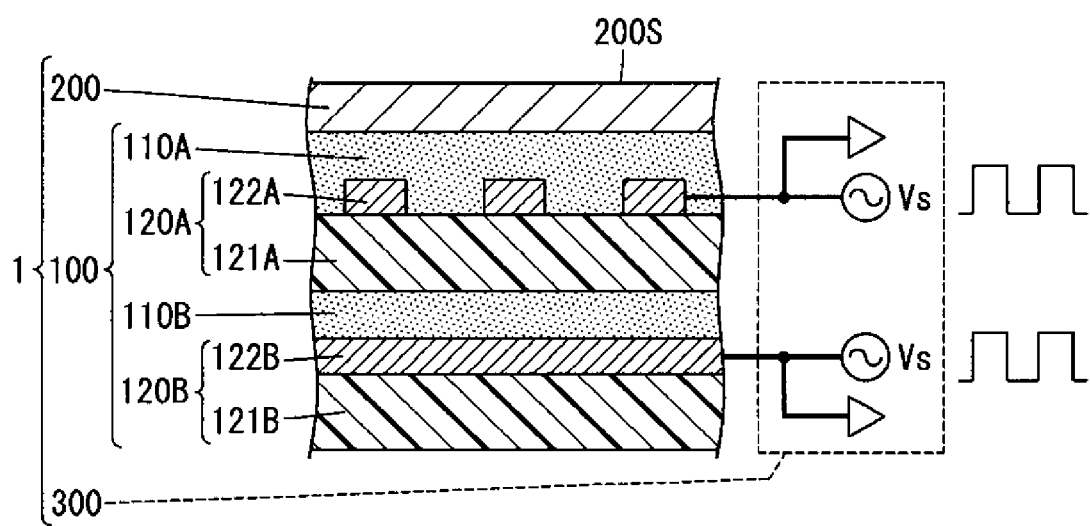
FIG. 2B is a schematic cross-sectional view illustrating the touch panel of FIG. 2A taken along cut line H-H.
Figure 3:
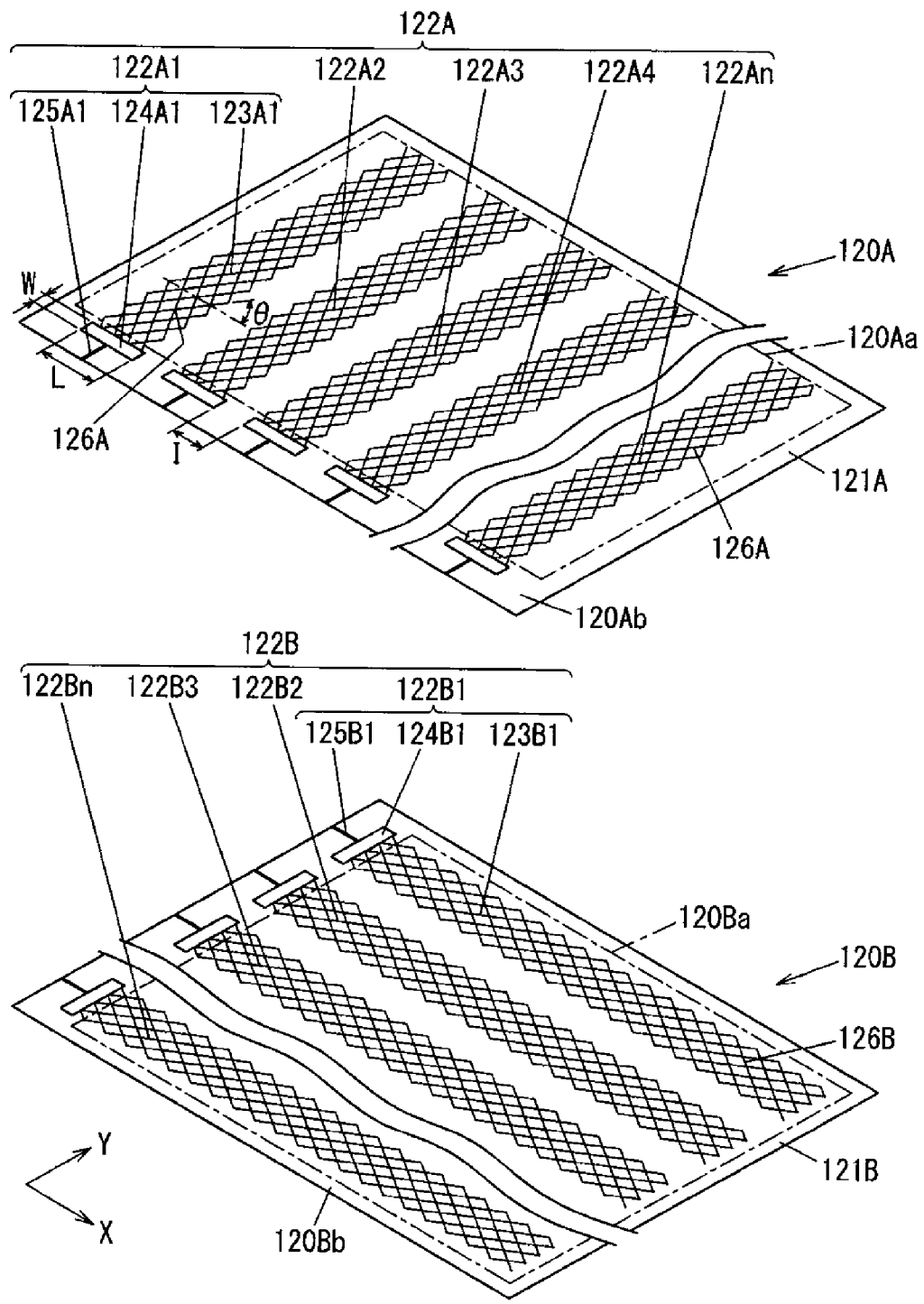
FIG. 3 is a schematic exploded perspective view illustrating a first electrode substrate and a second electrode substrate in the first exemplary embodiment.

FIG. 1 is a schematic exploded perspective view illustrating image display device 400 including touch panel 1 according to the first exemplary embodiment. FIG. 2A is a schematic front view illustrating touch panel 1. FIG. 2B is a schematic cross-sectional view illustrating touch panel 1 of FIG. 2A taken along cut line H-H. FIG. 3 is a schematic exploded perspective view illustrating first electrode substrate 120A and second electrode substrate 120B in the first exemplary embodiment. It is noted that illustrations of first conductive patterns 122A1 to 122An, second conductive patterns 122B1 to 122Bn, and position detection circuit 300 are omitted in FIG. 1. And in FIG. 2A, illustrations of first conductive pattern group 122A and second conductive pattern group 122B are simplified.

Touch panel 1 according to the first exemplary embodiment is a self-capacitance type touch panel which is one kind of a projected capacitive touch panel. The self-capacitance type means a detection type in which one electrode plays the roles of both drive electrode and detection electrode, and detects changes in electrostatic capacity (self-capacitance) between the electrode and the ground.

Touch panel 1 includes touch panel member 100, cover 200, and position detection circuit 300. Touch panel member 100 has first conductive pattern group 122A and second conductive pattern group 122B that serve as electrodes.

Cover 200 is disposed on touch panel member 100 as illustrated in FIG. 1. Position detection circuit 300 is electrically connected to first conductive pattern group 122A and second conductive pattern group 122B as illustrated in FIG. 2B to apply equal voltages to first conductive pattern group 122A and second conductive pattern group 122B, for example.

Touch panel 1 is disposed on a front side of a display surface (hereinafter, called front surface side) of image display device 400 as illustrated in FIG. 1. The display surface of image display device 400 has image display region 400a to which images are output and non-image display region 400b to which no images are output. Non-image display region 400b is formed to surround an outer edge of image display region 400a as illustrated in FIG. 1. Image display device 400 can be any of publicly known image display devices such as liquid crystal display panel, plasma image display panel, electroluminescence panel, electronic paper, and cathode ray tube, for example.

As being viewed from a front side, touch panel 1 has viewing regions (hereinafter, called touch regions) 200a, 120Aa, 120Ba and non-viewing regions (hereinafter, called frame regions) 200b, 120Ab, 120Bb. The viewing regions are corresponding to image display region 400a in the display surface of image display device 400. And the non-viewing regions are corresponding to non-image display region 400b in the display surface of image display device 400, as illustrated in FIG. 1.

Figure 4A:
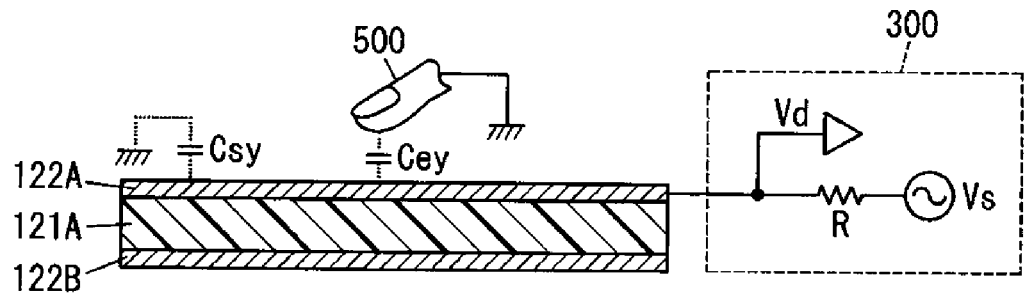
FIG. 4A is a schematic cross-sectional view illustrating a self capacitance-type touch panel for describing an operating principle.
Figure 4B:
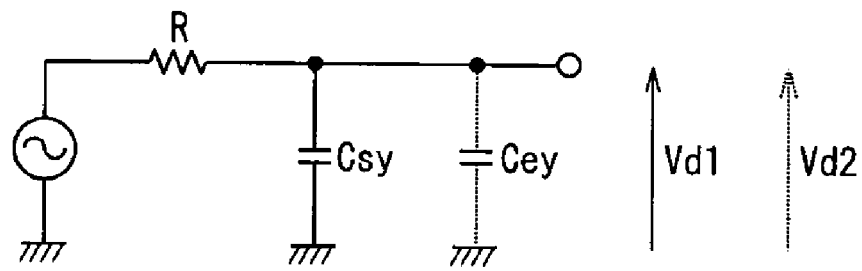
FIG. 4B is an equivalent circuit diagram of the self capacitance-type touch panel.
Figure 4C:
FIG. 4C is a schematic diagram illustrating a waveform of a drive voltage applied to a first conductive pattern group and a second conductive pattern group.
Figure 4D:
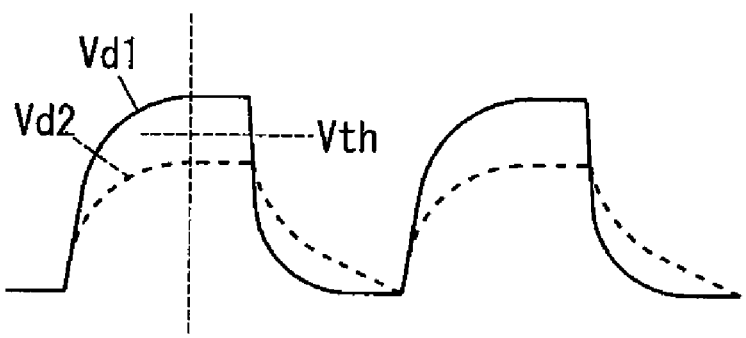
FIG. 4D is a schematic diagram illustrating a waveform of a detection voltage without a touch by a conductor and a waveform of a detection voltage with a touch by the conductor.

FIG. 4A is a schematic cross-sectional view illustrating self capacitance-type touch panel 1 for describing an operating principle. FIG. 4B is an equivalent circuit diagram of self capacitance-type touch panel 1. FIG. 4C is a schematic diagram illustrating a waveform of drive voltage Vs applied to first conductive pattern group 122A and second conductive pattern group 122B. FIG. 4D is a schematic diagram illustrating a waveform of detection voltage Vd1 without a touch by conductor 500 and a waveform of detection voltage Vd2 with a touch by conductor 500. In FIG. 4A, first conductive pattern group 122A and second conductive pattern group 122B are simply illustrated.

The principle under which a position of contact between cover 200 and conductor 500 on touch panel 1 (hereinafter, called touch position) is detected will be roughly described below. As illustrated in FIG. 4A, there exists floating capacitance Csy between the ground and first conductive pattern group 122A to which drive voltage Vs illustrated in FIG. 4C as an alternating signal is applied from an alternating signal source of position detection circuit 300. In this state, when conductor 500 touches surface 200S of cover 200, electrostatic capacity Cey is generated between first conductive pattern group 122A and conductor 500. Part of electric charge charged in floating capacitance Csy escapes to the ground through the finger due to electrostatic capacity Cey. Accordingly, detection voltage Vd2 is smaller than detection voltage Vd1 without a touch as illustrated in FIG. 4D. Therefore, comparing preset threshold voltage Vth with detection voltage Vd2 makes it possible to detect the touch on touch panel 1. Second conductive pattern group 122B operates in the same manner as first conductive pattern group 122A.

Examples of the conductor 500 include conductors such as a user's fingertip, stylus, and pointer. In the first exemplary embodiment, the detection type is the self-capacitance type but the present disclosure is not limited to this. The detection type may be a mutual-capacitance type or a combination of self-capacitance type and mutual-capacitance type.

[Touch Panel Member 100 According to First Exemplary Embodiment]

Touch panel member 100 according to the first exemplary embodiment includes first transparent resin layer 110A (hereinafter, called upper transparent resin layer 110A), first electrode substrate 120A (hereinafter, called upper electrode substrate 120A), second transparent resin layer 110B (hereinafter, called lower transparent resin layer 110B), and second electrode substrate 120B (hereinafter, called lower electrode substrate 120B) as illustrated in FIG. 1.

Upper transparent resin layer 110A, upper electrode substrate 120A, lower transparent resin layer 110B, and lower electrode substrate 120B are stacked in this order as illustrated in FIG. 2B. That is, first conductive pattern group 122A and second conductive pattern group 122B are disposed via first substrate 121A and lower transparent resin layer 110B described later to form a two-layer structure.

[Upper Electrode Substrate 120A]

Upper electrode substrate 120A includes first substrate 121A and first conductive pattern group 122A as illustrated in FIG. 3. First substrate 121A has a first main surface and a second main surface. First conductive pattern group 122A is formed on the first main surface of first substrate 121A.

Upper electrode substrate 120A is disposed such that the first main surface of first substrate 121A faces the upper transparent resin layer 110A as illustrated in FIG. 2B. In the first exemplary embodiment, the first main surface of first substrate 121A faces the upper transparent resin layer 110A. However, the present disclosure is not limited to this but the second main surface of first substrate 121A may face upper transparent resin layer 110A.

{First Conductive Pattern Group 122A}

First conductive pattern group 122A has n first conductive patterns 122A1 to 122An. First conductive patterns 122A1 to 122An extend along a first direction (hereinafter, called Y direction) and are electrically insulated from one another and disposed in parallel in a second direction orthogonal to the Y direction (hereinafter, called X direction). The number n is an integer of 1 or larger and can be adjusted as appropriate according to the size of image display region 400a of image display device 400.

<First Conductive Pattern 122A1>

First conductive pattern 122A1 has first electrode portion 123A1, first electrode pad portion 124A1, and first extraction electrode portion 125A1 as illustrated in FIG. 3. First electrode portion 123A1, first electrode pad portion 124A1, and first extraction electrode portion 125A1 are disposed in this order and are integrated with each other in the Y direction as illustrated in FIG. 3, and are electrically connected to one another.

(First Electrode Portion 123A1)

First electrode portion 123A1 extends along the Y direction and has a first mesh structure that includes first square lattice 126A formed from a first thin metal wire as illustrated in FIG. 3. That is, first electrode portion 123A1 is see-through and has an approximately bar-like (approximately belt-like) outer shape (contour shape) in a longitudinal direction as the Y direction. Most part of first electrode portion 123A1 is disposed in touch region 120Aa as illustrated in FIG. 3.

A length of first electrode portion 123A1 as seen in the Y-direction can be adjusted as appropriate according to a size of image display region 400a of image display device 400, preferably 0.05 m to 5.00 m, inclusive. A width of first electrode portion 123A1 as seen in the X direction can be adjusted as appropriate according to the size of image display region 400a of image display device 400, preferably 3 mm to 10 mm inclusive.

First electrode portion 123A1 has the first mesh structure constituted by first square lattice 126A as illustrated in FIG. 3. The first mesh structure is a structure in which mainly first square lattice 126A is continuous in an even manner. First electrode portion 123A1 has the mesh structure constituted by first square lattice 126A and thus is easy to design as compared to the case in which first electrode portion 123A1 has a mesh structure constituted by a pattern other than first square lattice 126A, such as a rectangular lattice or a triangular lattice. Length PA of one side of first square lattice 126A ranges preferably from 200 μm to 6000 μm, inclusive, more preferably from 200 μm to 2000 μm, inclusive, further more preferably from 200 μm to 1000 μm, inclusive, and in particular preferably from 300 μm to 800 μm, inclusive. Setting length PA of one side of first square lattice 126A within the foregoing range makes it possible to optimize a value of detection sensitivity to a touch operation and correspond to miniaturization of the product. In the first exemplary embodiment, the lattice formed from the first thin metal wires is first square lattice 126A. However, the present disclosure is not limited to this but the lattice constituted by the first thin metal wires may be a triangular lattice, a rectangular lattice, a rhombic lattice, or a hexagon lattice, for example.

A mesh angle θ of first square lattice 126A is 60°, not 0°, 45°, or 90°, with respect to the Y direction. If mesh angle θ of first square lattice 126A is 0°, 45°, or 90°, when image display device 400 is a liquid crystal display panel, for example, an arrangement period of first square lattice 126A and an arrangement period of pixels in image display region 400a of the liquid crystal display panel may interfere with each other to generate interference fringe (moire).

A line width of the first thin metal wires ranges preferably from 1 μm to 20 μm, inclusive, more preferably from 1 μm to 8 μm, inclusive, further preferably from 1 μm to 3 μm, inclusive. Setting the line width of the first thin metal wires within the foregoing range makes the first thin metal wires hard to break and makes first electrode portions 123A1 to 123An hard to recognize by the naked eye.

Examples of a material for the first thin metal wires include metals such as copper (Cu), silver (Ag), aluminum (Al), chrome (Cr), nickel (Ni), molybdenum (Mo), iron (Fe), gold (Au), and titanium (Ti), and alloys of two or more of these metals. The first thin metal wires may have a blackened film on their upper surfaces or side surfaces. Accordingly, even if a metal with high reflectance is used as a material for the first thin metal wires, the first thin metal wires can be made less visible. Examples of a material for the blackened film include metallic oxides, metallic sulfides, chrome, carbon, and others.

(First Electrode Pad Portion 124A1)

First electrode pad portion 124A1 binds the plurality of first thin metal wires into one. Accordingly, even if some of the first thin metal wires electrically connected to first electrode pad portion 124A1 become disconnected, it is possible to detect the touch position and make touch panel 1 less likely to be broken. First electrode pad portion 124A1 is disposed in frame region 120Ab and has a solid structure extending along the X direction as illustrated in FIG. 3. That is, a contour shape of first electrode pad portion 124A1 is a bar shape as seen in a longitudinal direction as the X direction. Width W of first electrode pad portion 124A1 as seen in the Y direction ranges preferably from 500 μm to 3000 μm, inclusive. Length L of first electrode pad portion 124A1 as seen in the X direction ranges preferably from 3000 μm to 10000 μm, inclusive. A number of contacts between first electrode pad portion 124A1 and the first thin metal wires ranges preferably from 4 to 6, inclusive. A material for first electrode pad portion 124A1 can be the same as any of the examples of material for the first thin metal wires described above, for example. The solid structure is a solid pattern that has a structure without an opening.

(First Extraction Electrode Portion 125A1)

First extraction electrode portion 125A1 electrically connects together first electrode pad portion 124A1 and position detection circuit 300. First extraction electrode portion 125A1 is disposed in frame region 120Ab and has a line structure as illustrated in FIGS. 1 and 3. A wire width of first extraction electrode portion 125A1 ranges preferably from 10 μm to 200 μm, inclusive. A material for first extraction electrode portion 125A1 can be similar to any of the examples of material for the first thin metal wires, for example.

<First Conductive Patterns 122A2 to 122An>

First conductive patterns 122A2 to 122An are configured in the same manner as first conductive pattern 122A1. That is, first conductive pattern group 122A includes a plurality of first electrode portions 123A1 to 123An each of which extends along the Y direction and has a first mesh structure constituted by first thin metal wires.

First conductive patterns 122A1 to 122An are disposed in parallel so as to have a predetermined space between adjacent two, and are electrically insulated from each other as illustrated in FIG. 3. Space I between adjacent two of first electrode portions 123A1 to 123An ranges preferably from 30 μm to 300 μm, inclusive.

A wiring density of first conductive pattern group 122A ranges preferably from 70.0% to 99.9%, inclusive, more preferably from 95.0% to 99.9%, inclusive. The wiring density of first conductive pattern group 122A refers to a ratio of entire area of first conductive pattern group 122A in touch region 120Aa with respect to an entire area of touch region 120Aa. A sheet resistance of first conductive pattern group 122A ranges preferably from 0.1 Ω/sq (Q/cm$^2$) to 5.0 Ω/sq, inclusive, more preferably from 0.1 Ω/sq to 1.0 Ω/sq, inclusive.

{First Substrate 121A}

First substrate 121A is plate-like in shape and has electrical insulating properties and transparency. A thickness of first substrate 121A can be adjusted as appropriate according to the use of touch panel 1, and ranges preferably from 10 μm to 400 μm, inclusive, more preferably from 50 μm to 200 μm, inclusive. Examples of a material for first substrate 121A include glass, plastic, and others. Examples of plastic include acryl, polystyrene (PE), polystyrene terephthalate (PET), polyimide (PI), polystyrene (PS), polymethylmethacrylate (PMMA), polycarbonate (PC), polyvinyl chloride (PVC), polyvinylidene chloride (PVDC), polypropylene (PP), polyamide (PA), polyamide-imide (PAI), polyetherimide (PEI), polybutylene terephthalate (PBT), and polyethylene naphthalate (PEN). Among them, PET is preferred from the viewpoint of light transmittance and processability. First substrate 121A may have functional layers as necessary. Examples of the functional layers include an undercoat layer that reinforces adhesiveness, an optical filter layer that absorbs light with a specific wavelength to prevent halation, an antistatic layer, a refraction adjustment layer that improves transmittance, and others.

[Lower Electrode Substrate 120B]

Lower electrode substrate 120B includes second substrate 121B and second conductive pattern group 122B as illustrated in FIG. 3. Second substrate 121B has a first main surface and a second main surface. Second conductive pattern group 122B is formed on the first main surface of second substrate 121B. Lower electrode substrate 120B is disposed such that the first main surface of second substrate 121B faces the upper transparent resin layer 110A as illustrated in FIG. 2B. In the first exemplary embodiment, the first main surface of second substrate 121B faces the upper transparent resin layer 110A. However, the present disclosure is not limited to this but the second main surface of second substrate 121B may face upper transparent resin layer 110A.

{Second Conductive Pattern Group 122B}

Figure 5:
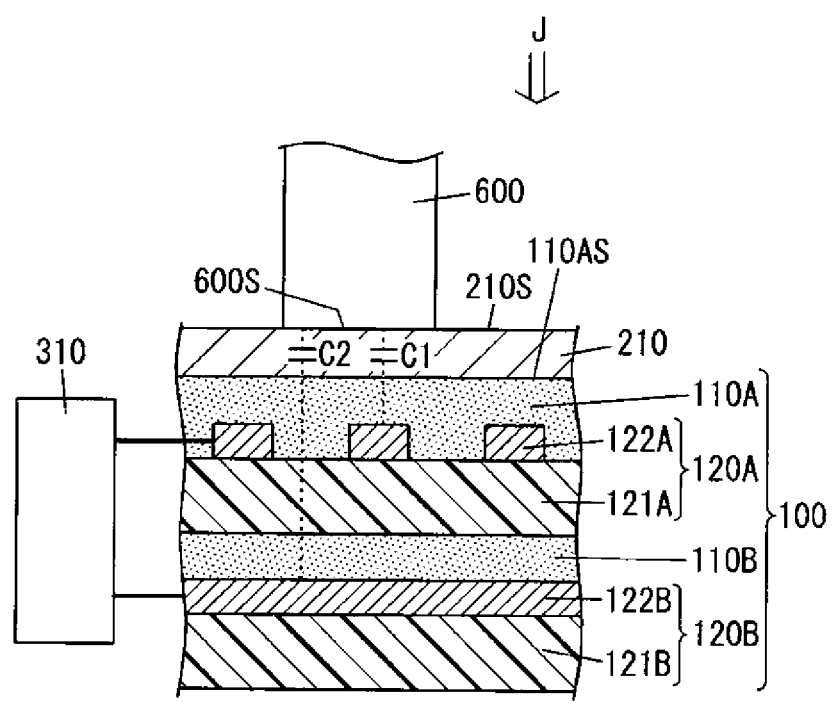
FIG. 5 is a schematic cross-sectional view of a touch panel member, illustrating a state in which one reference conductor is in contact with a surface of the touch panel member with a touch panel cover.

FIG. 5 is a schematic cross-sectional view of a touch panel member, illustrating a state in which one reference conductor is in contact with a surface of the touch panel member with a touch panel cover.

Second conductive pattern group 122B has plural (n) second conductive patterns 122B1 to 122Bn. Second conductive patterns 122B1 to 122Bn are electrically insulated from one another and are disposed in parallel in the Y direction.

In touch panel member 100 according to the first exemplary embodiment, as illustrated in FIG. 5, when one reference conductor 600 is brought into contact with touch panel cover 210 while touch panel cover 210 is disposed on upper transparent resin layer 110A at surface 110AS that is opposite to upper electrode substrate 120A, second conductive pattern group 122B is configured to cause second electrostatic capacity C2 between reference conductor 600 and second conductive pattern group 122B range from 80% to 120%, inclusive, of first electrostatic capacity C1 between reference conductor 600 and first conductive pattern group 122A. In this case, as illustrated in FIG. 5, testing position detection circuit 310 is electrically connected to first conductive pattern group 122A and second conductive pattern group 122B, and equal voltages are applied to first conductive pattern group 122A and second conductive pattern group 122B. A contact region in which reference conductor 600 and touch panel cover 210 are in contact with each other is disposed within touch regions 120Aa and 120Ba.

Specifically, in the first exemplary embodiment, a second mesh structure is configured such that the wiring density is greater than the wiring density of the first mesh structure as described later. Accordingly, in the first exemplary embodiment, first conductive pattern group 122A and second conductive pattern group 122B are designed such that first electrostatic capacity C1 and second electrostatic capacity C2 for reference conductor 600 become almost the same. Therefore, in touch panel 1 with touch panel member 100, both the detection sensitivity of the X axis and the detection sensitivity of the Y axis to conductor 500 are good. This provides see-through electrodes having two-layer structure with excellent detection sensitivity.

Second electrostatic capacity C2 ranges from 80% to 120%, inclusive, preferably from 90% to 110%, inclusive, and is more preferably 100% of first electrostatic capacity C1. When second electrostatic capacity C2 is less than 80% of first electrostatic capacity C1, electrostatic capacity C1 is too large and electrostatic capacity C2 is too small. Accordingly, the detection sensitivity of the Y axis to conductor 500 on touch panel 1 may be low. When second electrostatic capacity C2 is greater than 120% of first electrostatic capacity C1, electrostatic capacity C1 is too small and electrostatic capacity C2 is too large. Accordingly, the detection sensitivity of the X axis to conductor 500 on touch panel 1 may be low. As second electrostatic capacity C2 becomes closer to 100% of first electrostatic capacity C1, that is, as second electrostatic capacity C2 and first electrostatic capacity C1 become closer to each other, the see-through electrodes having two-layer structure is more excellent in the detection sensitivity.

To measure electrostatic capacity C1 and electrostatic capacity C2, for example, there are methods using measurement devices such as LCR meter, impedance analyzer, network analyzer, and others.

In addition, electrostatic capacity C1 or electrostatic capacity C2 can also be calculated by the following formula:

$$C_f = \frac{\varepsilon_0 \varepsilon_r S}{d}$$ [Mathematical Formula 1]

Herein, $C_f$ represents electrostatic capacity C1 or electrostatic capacity C2; $\varepsilon_0$ represents vacuum dielectric constant $8.85 \times 10^{-12}$; $\varepsilon_r$ represents a dielectric constant of a dielectric body between reference conductor 600 and first conductive pattern group 122A or second conductive pattern group 122B (hereinafter, called conductive pattern group); S represents an effective area of electrodes formed from reference conductor 600 and conductive pattern group; and d represents a distance between reference conductor 600 and the conductive pattern group. In this case, effective area S for calculating electrostatic capacity C1 refers to an area of first conductive pattern group 122A in an overlapping region between reference conductor 600 and first conductive pattern group 122A when touch panel member 100 is seen from front side J. Effective area S for calculating electrostatic capacity C2 refers to an area of second conductive pattern group 122B in an overlapping region between reference conductor 600 and second conductive pattern group 122B when touch panel member 100 is seen from front side J.

Reference conductor 600 has a similar degree of dielectric constant of a fingertip and can be a conductor such as a user's fingertip, stylus, or pointer, for example. A size of reference conductor 600 can be a similar degree of a size of one fingertip. For example, reference conductor 600 can be desidned so that an area of contact surface 600S of reference conductor 600 in surface 210S of touch panel cover 210 ranges preferably from 0.4 cm² to 1.0 cm², inclusive, more preferably from 0.4 cm² to 0.7 cm², inclusive when one reference conductor 600 is brought into contact with surface 210S of touch panel cover 210.

Touch panel cover 210 is configured in the same manner as cover 200. Testing position detection circuit 310 is configured in the same manner as position detection circuit 300.

<Second Conductive Pattern 122B1>

Second conductive pattern 122B1 has second electrode portion 123B1, second electrode pad portion 124B1, and second extraction electrode portion 125B1 as illustrated in FIG. 3. Second electrode portion 123B1, second electrode pad portion 124B1, and second extraction electrode portion 125B1 are disposed in this order and are integrated with each other along the X direction, and are electrically connected to one another.

As described later, second conductive pattern 122B1 is designed in the same manner as first conductive pattern 122A1 except that the wiring density of the second mesh structure is greater than the wiring density of the first mesh structure. In this case, the wiring density of the first mesh structure is equal to the wiring density of first conductive pattern group 122A described above. The wiring density of the second mesh structure is equal to the wiring density of second conductive pattern group 122B described later.

(Second Electrode Portion 123B1)

Figure 6:
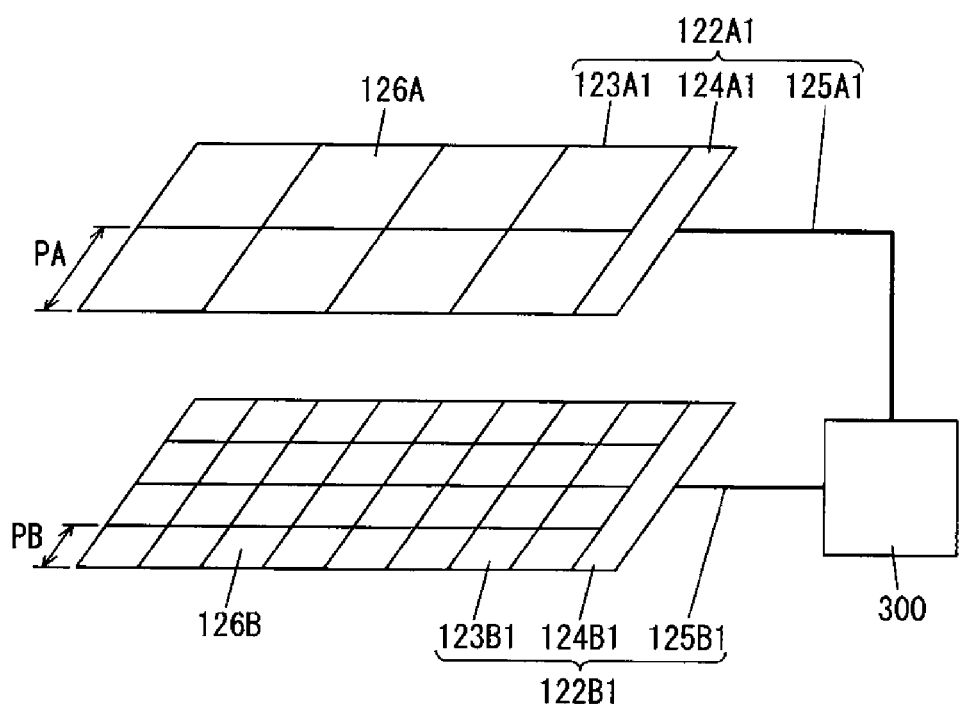
FIG. 6 is a schematic illustrative diagram illustrating the first conductive pattern and the second conductive pattern in the first exemplary embodiment.

FIG. 6 is a schematic illustrative diagram of first conductive pattern 122A1 and second conductive pattern 122B1 in the first exemplary embodiment.

Second electrode portion 123B1 extends along the X direction and has a second mesh structure constituted by second square lattice 126B made of second thin metal wires as illustrated in FIG. 3. That is, second electrode portion 123B1 is see-through and has a bar-like shape (belt-like shape) in a longitudinal direction as the X direction. Most part of second electrode portion 123B1 is disposed in touch region 120Ba.

Second electrode portion 123B1 has the second mesh structure constituted by second square lattice 126B as illustrated in FIG. 3. The second mesh structure is a structure in which mainly second square lattice 126B is continuous in an even manner. Second electrode portion 123B1 has the mesh structure constituted by second square lattice 126B and thus is easy to design as compared to the case in which second electrode portion 123B1 has a mesh structure constituted by a pattern other than second square lattice 126B, such as a rectangular lattice or a triangular lattice.

The wiring density of the second mesh structure is greater than the wiring density of the first mesh structure as illustrated in FIG. 6. That is, length PB of one side of second square lattice 126B is shorter than length PA of one side of first square lattice 126A. Length PB of one side of second square lattice 126B may be adjusted as appropriate according to a thickness of lower transparent resin layer 110B and the like, and ranges preferably from ½ time to ¼ time, inclusive, more preferably from ⅓ time to ¼ time, inclusive, larger than length PA of one side of first square lattice 126A. Accordingly, in the first exemplary embodiment, as illustrated in FIG. 5, when one reference conductor 600 is brought into contact with touch panel cover 210, second electrostatic capacity C2 can range from 80% to 120%. Inclusive, of first electrostatic capacity C1.

<Second Conductor Patterns 122B2 to 122Bn>

Second conductor patterns 122B2 to 122Bn are configured in the same manner as second conductive pattern 122B1. Specifically, second conductive pattern group 122B includes a plurality of second electrode portions 123B1 to 123Bn each of which extends along the X direction and has a second mesh structure formed from first thin metal wires.

A wiring density of second conductive pattern group 122B is lower than a wiring density of first conductive pattern group 122A, and ranges preferably from 70.0% to 99.9%, inclusive, more preferably from 95.0% to 99.9%, inclusive. The wiring density of second conductive pattern group 122B refers to a ratio of entire area of second conductive pattern group 122B in touch region 120Ba with respect to an entire area of touch region 120Ba. A sheet resistance of second conductive pattern group 122B ranges preferably from 0.1 Ω/sq to 5.0 Ω/sq, inclusive, more preferably from 0.1 Ω/sq to 1.0 Ω/sq, inclusive.

In the first exemplary embodiment, second conductive pattern group 122B is designed in the same manner as first conductive pattern group 122A except that the wiring density of the second mesh structure is greater than the wiring density of the first mesh structure. However, the present disclosure is not limited to this but the second conductive pattern group can be configured such that, when one reference conductor is brought into contact with the cover, the second electrostatic capacity ranges from 80% to 120%, inclusive, of the first electrostatic capacity. For example, the second conductive pattern group may be designed in the same manner as the first conductive pattern group except that the second conductive pattern group has the second thin metal wires thicker than the first thin metal wires. In the first exemplary embodiment, first conductive pattern group 122A and second conductive pattern group 122B are orthogonal to each other. However, the present disclosure is not limited to this but the first conductive pattern group and the second conductive pattern group may not cross each other or may cross each other in a non-orthogonal manner.

{Second Substrate 121B}

Second substrate 121B is plate-like in shape and has electrical insulating properties and transparency. Second substrate 121B can be formed from the same material as that for first substrate 121A.

[Cover 200]

Cover 200 has transparency and electrical insulating properties and protects upper electrode substrate 120A and lower electrode substrate 120B. A material for cover 200 can be the same as any of the examples of material for first substrate 121A descried above. A thickness of cover 200 ranges preferably from 0.5 mm to 7.0 mm, inclusive. A bezel may be disposed in frame region 120b of cover 200 or a decoration layer of black makeup print may be applied to frame region 120b of cover 200. Accordingly, it is possible to conceal first electrode pad portion 124A1, first extraction electrode portion 125A1, second electrode pad portion 124B1, and second extraction electrode portion 125B1.

Surface 200S of cover 200 on the front side may have a functional film with an adhesive layer therebetween. Examples of the functional film include an anti-reflection (AR) film, an anti-glare (AG) film, an anti-fingerprint (AF) film, and others. An adhesive constituting the adhesive layer can be an acrylic adhesive (pressure sensitive adhesive) (PSA) or the like, for example.

[Position Detection Circuit 300]

Position detection circuit 300 determines coordinates at which conductor 500 is in contact with surface 200S of cover 200, for example. Position detection circuit 300 can be the circuit described in WO 2013/069289, for example.

[Method for Manufacturing Touch Panel 1]

A method for manufacturing touch panel 1 include, for example, a method by which cover 200 is stacked and thermally pressed on upper transparent resin layer 110A of touch panel member 100. As conditions for thermal pressing, for example, cover 200 is pressed in a stacking direction under a pressure ranging from 1 kPa to 3000 kPa, inclusive, (from 0.001 kgf/cm$^2$ to 30.6 kgf/cm$^2$, inclusive) while being heated for one minute to 120 minutes, inclusive, at 60 degrees to 160 degrees, inclusive, and then is cooled to room temperature in 0.001 minute to 60 minutes, inclusive. A method for manufacturing touch panel member 100 include, for example, a method by stacking an adhesive constituting lower electrode substrate 120B, lower transparent resin layer 110B, an adhesive constituting upper electrode substrate 120A, and upper transparent resin layer 110A in this order.

Examples of the adhesive constituting upper transparent resin layer 110A and lower transparent resin layer 110B include a heat welding film, a pressure-sensitive adhesive, and others. There is no particular limitation on the heat welding film as far as it takes a film shape at a temperature ranging from −10° C. to 40° C., inclusive. And the heat welding film gradually becomes softened or melted and adheres to an adjacent layer when being heated at a temperature ranging from 60° C. to 300° C., inclusive, preferably from 60° C. to 180° C., inclusive. Further the heat welding film becomes transparent when being hardened. A material for the heat welding film can be selected from a group consisting of polyethylene-vinyl acetate copolymer, amorphous polyethylene terephthalate homopolymer, amorphous polyethylene terephthalate copolymer, polyvinyl butyral homopolymer, and polyvinyl butyral copolymer. Upper transparent resin layer 110A and lower transparent resin layer 110B may be configured in the same or different manners.

As a method for manufacturing upper electrode substrate 120A, for example, first substrate 121A is prepared and first conductive pattern group 122A is formed on the first main surface of first substrate 121A. A method for forming first conductive pattern group 122A on the first main surface of first substrate 121A includes, for example, a method by which a first conductive material is stuck to the first main surface of first substrate 121A with an adhesive layer between the first conductive material and the first main surface, and is etched to form first conductive pattern group 122A. An another method for forming first conductive pattern group 122A on the first main surface of first substrate 121A includes, for example, a printing method, a photo-lithographic method, a photographic method, a method using a mask, a sputtering method, and an inkjet method. The first conductive material can be metal foil made from the same material as the material for the first thin metal wires, for example. Examples of the material for the adhesive layer for sticking the first conductive material to first substrate 121A include an acrylic resin, an epoxy resin, a urethane resin, and a resin based on a combination of two or more of these resins, and others. Examples of the printing method include offset printing, screen printing, gravure printing, flexographic printing, inkjet printing, and others. A method for manufacturing lower electrode substrate 120B can be the same as the method for manufacturing upper electrode substrate 120A.

[Touch Panel Member According to Second Exemplary Embodiment]

Figure 7:
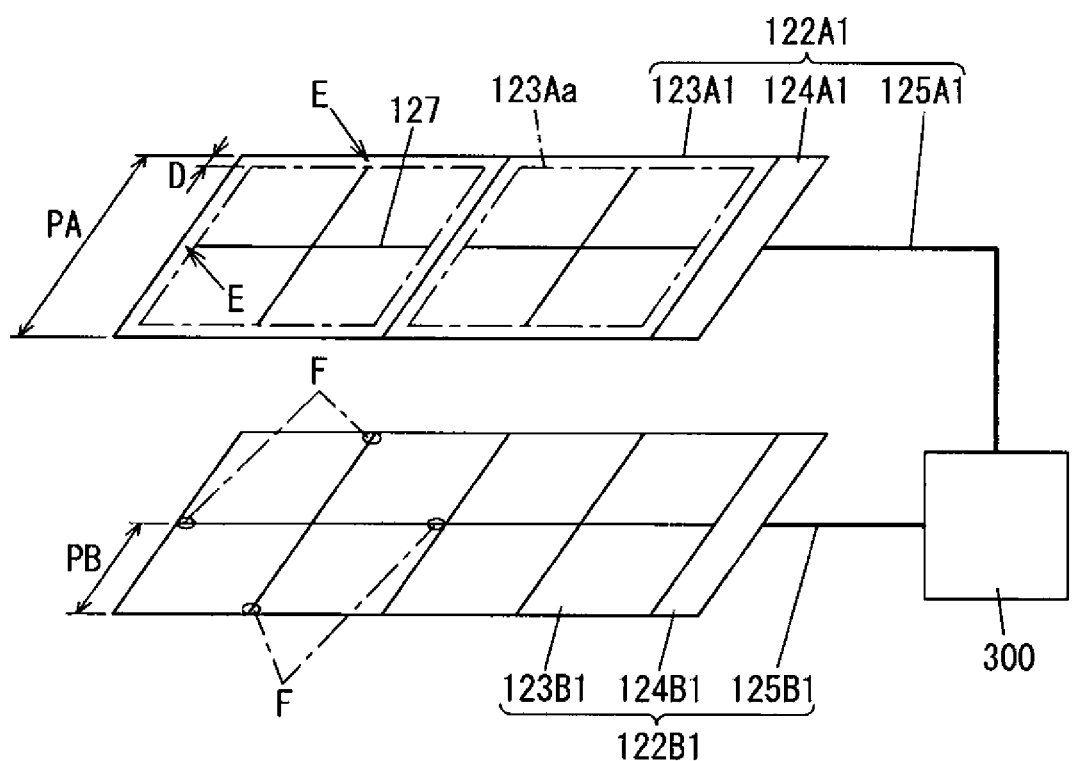
FIG. 7 is a schematic illustrative diagram illustrating a first conductive pattern and a second conductive pattern in a second exemplary embodiment.

FIG. 7 is a schematic illustrative diagram illustrating first conductive pattern 122A1 and second conductive pattern 122B1 in the second exemplary embodiment.

The touch panel member according to the second exemplary embodiment is configured in the same manner as touch panel member 100 according to the first exemplary embodiment except that the touch panel member according to the second exemplary embodiment further includes a plurality of first dummy electrode portions 127. In FIG. 7, the same components as the components illustrated in FIG. 6 are given the same reference signs as those of the components illustrated in FIG. 6, and descriptions of the same components will be omitted.

The touch panel member according to the second exemplary embodiment has a plurality of first dummy electrode portions 127 each of which is formed on a first main surface of first substrate 121A and made of first thin metal wires electrically insulated from first conductive pattern group 122A. As illustrated in FIG. 7, first dummy electrode portions 127 are formed in opening portions 123Aa of first electrode portions 123A1 to 123An so that a pattern formed by the plurality of first dummy electrode portions 127 and the plurality of first electrode portions 123A1 to 123An becomes substantially identical to a pattern of second electrode portions 123B1 to 123Bn. That is, a wiring density of the pattern formed by the plurality of first dummy electrode portions 127 and the plurality of first electrode portions 123A1 to 123An and a wiring density of second electrode portions 123B1 to 123Bn are designed to be identical. Accordingly, when the touch panel according to the second exemplary embodiment, which is configured in the same manner as touch panel 1 except that the touch panel member according to the second exemplary embodiment is used instead of touch panel member 100, is seen from the front side, the touch panel according to the second exemplary embodiment has entirely identical optical characteristics, that is, has an entirely uniform mesh structure to improve a quality of outer appearance of the touch panel.

First dummy electrode portions 127 have a cross-shaped structure along a long side of first electrode portion 123A1 and a short side of first electrode portion 123A1 orthogonal to the long side as illustrated in FIG. 7.

The cross-shaped structure is identical to the structure obtained by disconnecting F portions of second electrode portion 123B1 illustrated in FIG. 7. This improves the quality of outer appearance of the touch panel using the touch panel member according to the second exemplary embodiment. In the second exemplary embodiment, first dummy electrode portions 127 have a cross-shaped structure, but the present disclosure is not limited to this. That is, the structure of the first dummy electrode portions can be adjusted as appropriate according to the pattern of second electrode portions 123B1 to 123Bn as far as the first dummy electrode portions are electrically insulated from the first conductive pattern group and are formed in the opening portions of the first electrode portions such that the pattern formed by the first dummy electrode portions and the first electrode portions is identical to the pattern of the second electrode portions (except for the insulated portions described above).

There is cutout region E between first dummy electrode portion 127 and first electrode portion 123A1. Cutout width D is set to allow electrical insulation between first dummy electrode portion 127 and first electrode portion 123A1, and ranges preferably from 50 µm to 350 µm, inclusive, more preferably from 50 µm to 150 µm, inclusive.

[Touch Panel Member 102 According to Third Exemplary Embodiment]

Figure 8:
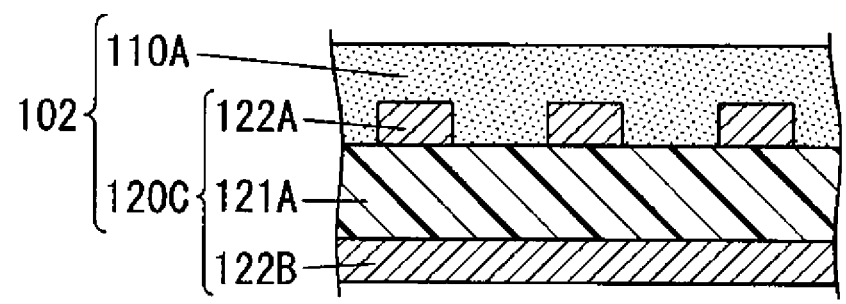
FIG. 8 is a schematic cross-sectional view illustrating a touch panel member according to a third exemplary embodiment.

FIG. 8 is a schematic cross-sectional view illustrating touch panel member 102 according to the third exemplary embodiment.

Touch panel member 102 according to the third exemplary embodiment is configured in the same manner as touch panel member 100 according to the first exemplary embodiment except that third electrode substrate 120C (hereinafter, called double-sided electrode substrate 120C) is used instead of upper electrode substrate 120A and lower electrode substrate 120B as illustrated in FIG. 8. Accordingly, in to the description regarding touch panel member 102, the same components as those of touch panel member 100 will be given the same reference signs as those of the components of touch panel member 100, and descriptions of the same components will be omitted. A third conductive pattern group described later is configured in the same manner as second conductive pattern group 122B and thus will be given the same reference sign as that of second conductive pattern group 122B, and descriptions of the third conductive pattern group will be simplified.

Touch panel member 102 includes upper transparent resin layer 110A and double-sided electrode substrate 120C. Double-sided electrode substrate 120C has first conductive pattern group 122A and third conductive pattern group 122B as illustrated in FIG. 8.

Upper transparent resin layer 110A is stacked on double-sided electrode substrate 120C as illustrated in FIG. 8. That is, first conductive pattern group 122A and third conductive pattern group 122B are disposed to sandwich first substrate 121A between first conductive pattern group 122A and third conductive pattern group 122B, and forms a two-layer structure.

Double-sided electrode substrate 120C includes first substrate 121A, first conductive pattern group 122A, and third conductive pattern group 122B as illustrated in FIG. 8. First substrate 121A has a first main surface and a second main surface. First conductive pattern group 122A is formed on the first main surface of first substrate 121A. Third conductive pattern group 122B is formed on the second main surface of first substrate 121A. Double-sided electrode substrate 120C is disposed so that the first main surface of first substrate 121A faces the upper transparent resin layer 110A as illustrated in FIG. 8.

Third conductive pattern group 122B has n third conductive patterns 122B1 to 122Bn. Third conductive patterns 122B1 to 122Bn are electrically insulated from each other and are disposed in parallel along the Y direction.

In touch panel member 102 according to the third exemplary embodiment, when one reference conductor 600 is brought into contact with touch panel cover 210 while touch panel cover 210 is disposed on upper transparent resin layer 110A at surface 110AS opposite to first substrate 121A, third conductive pattern group 122B is configured to cause a third electrostatic capacity between reference conductor 600 and third conductive pattern group 122B range from 80% to 120%, inclusive, of first electrostatic capacity C1 between reference conductor 600 and first conductive pattern group 122A, as in the first exemplary embodiment. In this case, testing position detection circuit 310 is electrically connected to first conductive pattern group 122A and third conductive pattern group 122B, and equal voltages are applied to first conductive pattern group 122A and third conductive pattern group 122B. A contact region in which reference conductor 600 and touch panel cover 210 are in contact with each other is disposed within touch regions 120Aa and 120Ba.

Specifically, in the third exemplary embodiment, a third mesh structure constituted by third square lattice 126B made of the second thin metal wires is configured so that its wiring density is greater than the wiring density of the first mesh structure. Accordingly, in the third exemplary embodiment, first conductive pattern group 122A and third conductive pattern group 122B are designed so that first electrostatic capacity C1 and the third electrostatic capacity for reference conductor 600 become almost the same. Therefore, in the touch panel according to the third exemplary embodiment, which is configured in the same manner as touch panel 1 except that touch panel member 102 according to the third exemplary embodiment is used instead of touch panel member 100, both detection sensitivity of an X axis and detection sensitivity of a Y axis to conductor 500 are good. This provides see-through electrodes having two-layer structure with excellent detection sensitivity.

The third electrostatic capacity ranges from 80% to 120%, inclusive, preferably from 90% to 110%, inclusive, and is more preferably 100% of first electrostatic capacity C1. When the third electrostatic capacity is less than 80% of first electrostatic capacity C1, electrostatic capacity C1 is too large and the third electrostatic capacity is too small. Accordingly, the detection sensitivity of the Y axis to conductor 500 on the touch panel according to the third exemplary embodiment may be low. When the third electrostatic capacity is larger than 120% of first electrostatic capacity C1, electrostatic capacity C1 is too small and the third electrostatic capacity is too large. Accordingly, the detection sensitivity of the X axis to conductor 500 on the touch panel according to the third exemplary embodiment may be low. As the third electrostatic capacity and first electrostatic capacity C1 are closer to each other, the see-through electrodes of two-layer structure are more excellent in the detection sensitivity. The third electrostatic capacity can be determined by the same method as the method described in relation to the first exemplary embodiment.

The wiring density of the third mesh structure is greater than the wiring density of the first mesh structure as in the first exemplary embodiment. That is, length PB of one side of third square lattice 126B is shorter than length PA of one side of first square lattice 126A. Length PB of one side of third square lattice 126B can be adjusted as appropriate according to a thickness of first substrate 121A and the like, and ranges preferably from ½ time to ¼ time, inclusive, more preferably from ⅓ time to ¼ time, inclusive, larger than length PA of one side of first square lattice 126A. Accordingly, in the third exemplary embodiment, when one reference conductor 600 is brought into contact with touch panel cover 210, the third electrostatic capacity can be 80% to 120%, inclusive, of first electrostatic capacity C1.

In the third exemplary embodiment, third conductive pattern group 122B is designed in the same manner as first conductive pattern group 122A except that the wiring density of the third mesh structure is greater than the wiring density of the first mesh structure. However, the present disclosure is not limited to this but the third conductive pattern group is merely configured so that, when one reference conductor is brought into contact with the touch panel cover, the third electrostatic capacity becomes 80% to 120% inclusive of the first electrostatic capacity. For example, the third conductive pattern group may be designed in the same manner as first conductive pattern group 122A except that the second thin metal wires are thicker than the first thin metal wires. In the third exemplary embodiment, first conductive pattern group 122A and third conductive pattern group 122B are orthogonal to each other. However, the present disclosure is not limited to this but the first conductive pattern group and the third conductive pattern group may not cross each other or may cross each other in a non-orthogonal manner.

[Touch Panel Member According to Fourth Exemplary Embodiment]

The touch panel member according to the fourth exemplary embodiment is configured in the same manner as touch panel member 102 according to the third exemplary embodiment except that the touch panel member according to the fourth exemplary embodiment further includes a plurality of second dummy electrode portions. Hereinafter, the same components as the components illustrated in FIGS. 7 and 8 are given the same reference signs as those of the components illustrated in FIGS. 7 and 8, and descriptions of the same components will be omitted. In addition, the second dummy electrode portions described later are configured in the same manner as first dummy electrode portions 127 and thus will be given the same reference sign as that of first dummy electrode portions 127, and descriptions of the second dummy electrode portions will be simplified.

In the fourth exemplary embodiment, the touch panel member has a plurality of second dummy electrode portions 127 that is formed on a first main surface of first substrate 121A and is made of first thin metal wires electrically insulated from first conductive pattern group 122A. Second dummy electrode portions 127 are formed in opening portions 123Aa of first electrode portions 123A1 to 123An so that a pattern formed by second dummy electrode portions 127 and first electrode portions 123A1 to 123An becomes substantially identical to a pattern of third electrode portions 123B1 to 123Bn. That is, a wiring density of the pattern formed by the plurality of second dummy electrode portions 127 and the plurality of first electrode portions 123A1 to 123An and a wiring density of third electrode portions 123B1 to 123Bn are designed to be indentical. Accordingly, when the touch panel according to the fourth exemplary embodiment, which is configured in the same manner as touch panel 1 except that the touch panel member according to the fourth exemplary embodiment is used instead of touch panel member 100, is seen from the front side, the touch panel according to the fourth exemplary embodiment has entirely identical optical characteristics, that is, has an entirely uniform mesh structure to improve a quality of outer appearance of the touch panel member.

In the fourth exemplary embodiment, second dummy electrode portions 127 have a cross-shaped structure, but the present disclosure is not limited to this. That is, the structure of the first dummy electrode portions can be adjusted as appropriate according to the pattern of second electrode portions 123B1 to 123Bn as far as the first dummy electrode portions are electrically insulated from the first conductive pattern group and are formed in the opening portions of the first electrode portions such that the pattern formed by the first dummy electrode portions and the first electrode portions is identical to the pattern of the third electrode portions (except for the insulated portions described above).

The invention claimed is:

1. A touch panel member comprising:
a first transparent resin layer;
a first electrode substrate disposed under the first transparent resin layer;
a second transparent resin layer disposed under the first electrode substrate; and
a second electrode substrate disposed under the second transparent resin layer,
wherein:
the first electrode substrate includes a first substrate having a first main surface and a second main surface, and a first conductive pattern group disposed on the first main surface of the first substrate,
the second electrode substrate includes a second substrate having a first main surface and a second main surface, and a second conductive pattern group disposed on the first main surface of the second substrate,
when a reference conductor is brought into contact with a touch panel cover while the touch panel cover is disposed on the first transparent resin layer at a side opposite to the first electrode substrate, the second conductive pattern group is configured to cause a second electrostatic capacity between the reference conductor and the second conductive pattern group range from 80% to 120%, inclusive, of a first electrostatic capacity between the reference conductor and the first conductive pattern group,
the first conductive pattern group includes a plurality of first electrode portions each having a first mesh structure including a first thin metal wire,
the second conductive pattern group includes a plurality of second electrode portions each having a second mesh structure including a second thin metal wire,
a wiring density of the second mesh structure is greater than a wiring density of the first mesh structure,
the touch panel member further comprises a plurality of dummy electrode portions disposed on the first main surface of the first substrate, the plurality of dummy electrode portions being made of the first thin metal wire and electrically insulated from the first conductive pattern group,
each of the plurality of dummy electrode portions is disposed in an opening portion of the first mesh structure so that a pattern configured by the plurality of dummy electrode portions and the first mesh structure is substantially identical to the second mesh structure, and
a wiring density of the pattern configured by the plurality of dummy electrode portions and the first mesh structure is substantially same as the wiring density of the second mesh structure.

2. A touch panel member comprising:
a transparent resin layer; and
an electrode substrate disposed under the transparent resin layer,
wherein:
the electrode substrate includes a substrate having a first main surface and a second main surface, a first conductive pattern group disposed on the first main surface, and a second conductive pattern group disposed on the second main surface, the electrode substrate being disposed so that the first main surface faces the transparent resin layer, and
when a reference conductor is brought into contact with a touch panel cover while the touch panel cover is disposed on the transparent resin layer at a side opposite to the electrode substrate, the second conductive pattern group is configured to cause a second electrostatic capacity between the reference conductor and the second conductive pattern group range from 80% to 120%, inclusive, of a first electrostatic capacity between the reference conductor and the first conductive pattern group,
the first conductive pattern group includes a plurality of first electrode portions each having a first mesh structure including a first thin metal wire,
the second conductive pattern group includes a plurality of second electrode portions each having a second mesh structure including a second thin metal wire,
a wiring density of the second mesh structure is greater than a wiring density of the first mesh structure,
the touch panel member further comprises a plurality of dummy electrode portions disposed on the first main surface of the first substrate, the plurality of dummy electrode portions being made of the first thin metal wire and electrically insulated from the first conductive pattern group,
each of the plurality of dummy electrode portions is disposed in an opening portion of the first mesh structure so that a pattern configured by the plurality of dummy electrode portions and the first mesh structure is substantially identical to the second mesh structure, and
a wiring density of the pattern configured by the plurality of dummy electrode portions and the first mesh structure is substantially same as the wiring density of the second mesh structure.

3. The touch panel member according to claim 1, wherein:
a cutout region is disposed between the each of the plurality of dummy electrode portions and the each of the plurality of first electrode portions, and
a cutout width of the cutout region ranges from 50 μm to 350 μm, inclusive.

4. The touch panel member according to claim 2, wherein:
a cutout region is disposed between the each of the plurality of dummy electrode portions and the each of the plurality of first electrode portions, and
a cutout width of the cutout region ranges from 50 μm to 350 μm, inclusive.

* * * * *